United States Patent [19]
Lin et al.

[11] Patent Number: 5,966,163
[45] Date of Patent: Oct. 12, 1999

[54] PROVIDING CONSTANT BIT RATE UPSTREAM DATA TRANSPORT IN A TWO WAY CABLE SYSTEM BY SCHEDULING PREEMPTIVE GRANTS FOR UPSTREAM DATA SLOTS USING SELECTED FIELDS OF A PLURALITY OF GRANT FIELDS

[75] Inventors: Bouchung Lin, Cary, N.C.; Francis R. Koperda, Suwanee, Ga.

[73] Assignee: Scientific-Atlanta, Inc., Norcross, Ga.

[21] Appl. No.: 08/732,668

[22] Filed: Oct. 16, 1996

Related U.S. Application Data

[60] Provisional application No. 60/005,747, Oct. 20, 1995.

[51] Int. Cl.$^6$ ........................................... H04J 15/00
[52] U.S. Cl. ........................... 348/12; 370/439; 370/440; 370/442; 370/430
[58] Field of Search ............................. 348/12; 455/5.1; 370/430, 439, 440, 442; 393/200.93

[56] References Cited

U.S. PATENT DOCUMENTS

| | | | |
|---|---|---|---|
| 3,985,962 | 10/1976 | Jones et al. | 179/15 AL |
| 4,633,462 | 12/1986 | Stifle et al. | 370/85 |
| 4,641,304 | 2/1987 | Raychaudhuri | 370/95 |
| 4,757,460 | 7/1988 | Bione et al. | 364/514 |
| 4,907,224 | 3/1990 | Scoles et al. | 370/85.2 |
| 4,980,886 | 12/1990 | Bernstein | 370/80 |
| 5,012,469 | 4/1991 | Sardana | 370/95.3 |
| 5,157,657 | 10/1992 | Potter et al. | 370/85 |
| 5,278,833 | 1/1994 | Crisler et al. | 370/95.1 |
| 5,295,140 | 3/1994 | Crisler et al. | 370/94.1 |
| 5,303,234 | 4/1994 | Kou | 370/85.2 |
| 5,384,777 | 1/1995 | Ahmadi et al. | 370/85.2 |
| 5,390,181 | 2/1995 | Campbell et al. | 370/85.2 |
| 5,440,555 | 8/1995 | Momona | 370/79 |
| 5,517,502 | 5/1996 | Bestler et al. | 370/94.2 |
| 5,521,925 | 5/1996 | Merakos et al. | 370/95.3 |
| 5,535,206 | 7/1996 | Bestler et al. | 370/79 |

OTHER PUBLICATIONS

Chien–Ting Wu, et al. "A Cable TV Protocol Functioning As A Distributed Switch", *Extended DQRAP (XDQRAP)* Jun. 24, 1994, pp. 1–8.
International Telecommunication Union, "ITU–T Recommendation Q.2931", *Telecommunications Standardization Sector Of ITU*, Feb. 1995, pp. 1–249.
International Telecommunication Union, "ITU–T Recommendation Q.931", *Telecommunications Standardization Sector Of ITU*, Mar. 1993, pp. 1–317.
Chien–Ting Wu, et al. "Interleaved DQRAP with Global TQ", Jan. 8, 1995, pp. 1–26.
Chien–Ting Wu, et al. "Extended DQRAP (XDQRAP)", Jan. 8, 1995, pp. 1–4.

*Primary Examiner*—Lance Leonard Barry
*Attorney, Agent, or Firm*—Kenneth M. Massaroni; Hubert J. Barnhardt, III; Kelly A. Gardner

[57] ABSTRACT

In a two way cable system that includes a controller and a plurality of user terminals, a method of granting rights for upstream data transmission from the user terminals includes processing contention requests to generate contention grants and maintaining a list of connections, each connection having specified therefor a predetermined bit rate. The controller sends a downstream data stream to the user terminals and receives an upstream data stream from the user terminals. The downstream data stream includes a plurality of grant fields, and the upstream data stream includes upstream data slots and upstream control slots. The method further includes scheduling preemptive grants for upstream data slots using selected fields of the plurality of grant fields so as to provide preemptive grants for upstream data transport at a bit rate specified for each connection, sending to the user terminals a data transmission grant in a grant field of the plurality of grant fields for which a preemptive grant is scheduled, and sending to the user terminals a data transmission grant in a grant field of the plurality of grant fields in which a contention grant is pending and no preemptive grant is scheduled.

6 Claims, 6 Drawing Sheets

PROVIDING CONSTANT BIT RATE UPSTREAM DATA TRANSPORT IN A TWO WAY CABLE SYSTEM BY SCHEDULING PREEMPTIVE GRANTS FOR UPSTREAM DATA SLOTS USING SELECTED FIELDS OF A PLURALITY OF GRANT FIELDS

Benefit of the priority of the Oct. 20, 1995 filing date of provisional application 60/005,747 is hereby claimed.

BACKGROUND OF THE INVENTION

1. Field of the Invention

The present invention relates to a mechanism to provide constant bit rate upstream data transport in a two way communication system (e.g., a cable TV system) that has a known contention based upstream data transport mechanism. In particular, the invention relates to a mechanism to provide the constant bit rate upstream data transport, such as for a telephone voice channel, in a way that is compatible with known contention based available bit rate upstream data transport mechanisms so that jitter requirements of the constant bit rate transmission are fulfilled while not adversely effecting the latency of the available bit rate upstream data transport.

2. Description of Related Art

The upstream channel of a cable system is expected to carry a variety of services ranging from CBR (Constant Bit Rate) to ABR (Available Bit Rate) as defined by the ATM Forum (Asynchronous Transfer Mode Forum). These two services have unique sets of quality of service requirements such as jitter. For the CBR services, bounded jitter is required but not for the ABR services. ABR performance is measured on the system response time where the access delay plays a key role. CBR and ABR data are also different on the prospects of the traffic patterns. CBR sources produce data in a constant rate fashion while the ABR sources are usually in the burst mode. In the shared upstream channel of the cable television (CATV) environment, the services can not be optimized by a single Medium Access Control (MAC) protocol due to the above differences. The contention based Medium Access Control algorithm has been shown as an appropriate protocol for the local area network (LAN) traffic to provide instant access but it can not provide a guaranteed access environment for CBR sources to achieve bounded jitter.

One family of the contention algorithms, Distributed Queue Random Access Protocol (DQRAP), which uses a separate field (other than the data field) for resolving collisions while the user data transmission is taking place at the same time has been proposed to optimize the system throughput for ABR traffic. DQRAP has shown 85% of utilization with reasonable average access delay. It falls short of providing guaranteed access in order to support CBR services.

What is needed is a priority preempt mechanism to support guaranteed access in a contention based media access protocol in order to optimize these two services in the same system.

Historically, guaranteed access is provided via a TDMA (time division multiple access) arrangement. However, the TDMA approach can only provide services of an integer multiplier of a base rate. For example, these services are possible, 16 Kbps, 32 Kbps, 48 Kbps, etc., if the base rate is 16 kbps. Any request between two layers results in bandwidth waste.

TDMA is based on a cyclic framing structure. Access to the media is usually restricted until the start of the next cycle. It can be a long time if the frame is large or the transmission rate is low.

Another scheme often employed for guaranteed performance is when a station is polled periodically and the station can indicate if there is information to send. Performance of the source data can be guaranteed but at a significant waste of bandwidth because of the need to send the poll to a station and the bandwidth wasted when the station has nothing to send.

A media access control mechanism such as DQRAP uses a separated fields called Control Mini-Slots (CMS) to resolve collided transmissions while actual data transmission occurs at the data slot. Several CMSs associated with a data slot form the basic transmission unit. A station with packets ready for transmission choose one of the CMSs randomly to gain the right to transmit. Those stations that have already obtained the transmission rights are scheduled in a virtual queue called TQ (each station knows the total number of waiting members and its position among them). The requesting stations are informed of the success of the access requests by feedback sent by the Central Controller on the downstream channel with what is called contention grants. DQRAP has shown good performance in terms of Utilization vs. Access Delays. It is difficult and expensive to implement a priority scheme during the contention phase without priority protection. DQRAP can not guarantee bounded jitter which is required in order to support CBR services.

XDQRAP (Extended Distributed Queue Random Access Protocol) is a Medium Access Control (MAC) protocol designed to satisfy a wide range of performances required by the services that the IEEE 802.14 network is expected to provide. It is a contention-based protocol that provides LAN type of traffic an instant access environment. With a central feedback mechanism that is a natural result of the tree-and-branch network topology, it seamlessly marries a reservation scheme to offer deterministic access for the Constant Bit Rate (CBR) services. The MAC was presented in the paper *A proposal to Use XDQRAP for the IEEE* 802.14 (IEEE 802.14/95-068) at Section 5 entitled Media Access Control incorporated herein by reference. Simulation results of the basic XDQRAP were presented in the paper *Simulation of the Performance of XDQRAP under a Range of Conditions* (IEEE 802.14/95-049) at Sections 2 and 3, pages 3 and 4 incorporated herein by reference.

In the XDQRAP model, the channel time is partitioned into a sequence of time slots. Each unit consists of a data field where the actual data transmissions takes place and a control field used for requesting data slots. The request field consists of two areas called Control Mini Slots (CMS). Stations with data to transmit follow a set of rules to put the transmission requests in one of the control mini slots. The contention resolution algorithm is a tree based approach since there are potentially more than one request in the same control mini slot. By taking advantage of the central feedback, XDQRAP keeps the newly arrived packets out of contention to achieve fast-coverage resolution cycle.

The status of the control mini-slots and the data slots are constantly monitored at the headend. Based on the information, the global queuing information is fed back to the network via the common downstream channel. An individual station, therefore, adjusts its local state-machine accordingly. The contention winning stations position themselves in the global transmission sequence. Stations that lose in the contention retry at the next scheduled time.

Voice and some video conferencing data streams require that data arrives at the receiver within a narrow window of time (i.e., minimum jitter). Having contention for data slots is thus not a good mechanism to use for Constant Bit Rate (CBR) data streams. What is needed is a mechanism whereby a station can be guaranteed to send data at fixed intervals without having to use the control mini-slots to request data slots.

SUMMARY OF THE INVENTION

It is an object to the present invention to provide a priority preempt mechanism to support guaranteed access in a contention based media access protocol. It is a further object of the present invention to provide a mechanism for constant bit rate upstream data transport, such as for a telephone voice channel, in a way that is compatible with known contention based available bit rate upstream data transport mechanisms so that jitter requirements of the constant bit rate transmission are fulfilled while not adversely effecting the latency of the available bit rate upstream data transport.

These and other objects are achieved in a method of granting rights for upstream data transmission from user terminals that includes processing contention requests to generate contention grants and maintaining a list of connections, each connection having specified a predetermined bit rate. The method is practiced in a two way cable system that includes a controller and a plurality of the user terminals. The controller sends a downstream data stream to the user terminals and receives an upstream data stream from the user terminals. The downstream data stream includes a plurality of grant fields, and the upstream data stream includes upstream data slots and upstream control slots. The method further includes scheduling preemptive grants for upstream data slots using selected fields of the plurality of grant fields so as to provide preemptive grants for upstream data transport at a bit rate specified for each connection, sending to the user terminals a data transmission grant in a grant field of the plurality of grant fields for which a preemptive grant is scheduled, and sending to the user terminals a data transmission grant in a grant field of the plurality of grant fields in which a contention grant is pending and no preemptive grant is scheduled.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

Figure 1:
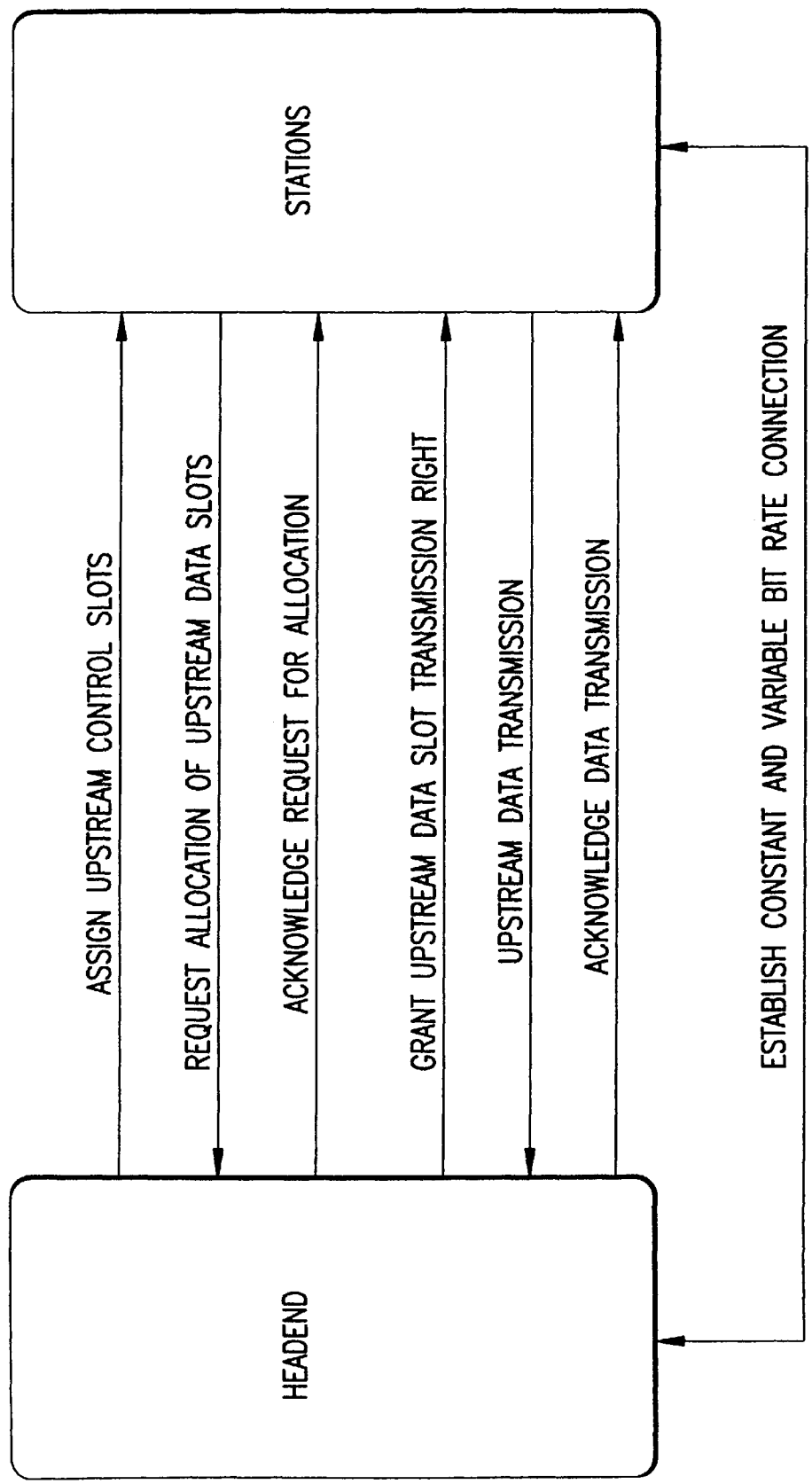
FIG. 1 is a function block diagram showing a signal interface between a headend and at least one station according to the present invention.

The preemptive grant mechanism can be used on top of DQRAP so that CBR sources can use access mechanisms such as DQRAP to obtain guaranteed access. The preemptive grant is issued by the Central Controller without a request from the station and bypasses the contention at the control mini-slot.

The preemptive grant mechanism is briefly described by the following:
1. When a CBR connection is committed, the Central Controller has information about the connection ID and the peak cell rate. This may be specified through a connection establishment mechanism such as the ITU standard Q.2931 incorporated herein by reference;
2. This information is added to a scheduler (part of the Central Controller function) which is tracking all the CBR connections in order to issue the preemptive grants;
3. The preemptive grants may be carried in the control mini-slot feedback on the downstream channel to inform the connections (stations) when the preemptive slots will be available. The contention users which are already in the TQ will also see the preemptive grants and priority preemption takes place.

The central controller operation is briefly described as follows:
1. The Central Controller receives a CBR requests and calculates the channel residual bandwidth to decide whether the connections can be granted. The connection will be rejected if there is not enough bandwidth;
2. The Central Controller creates (or adds the connection into) a scheduler;
3. The scheduler maintains a list of CBR connections and the associated information such as peak cell rates;
4. The preemptive grants are issued by the CBR scheduler when a scheduled slot is due;
5. The preemptive grants are carried on the downstream channel to the subscribers;
6. The TQ will not be changed.

For example, a feedback data field in the downstream channel from the controller to a user terminal will include a station or terminal ID and a transmission right type. The transmission right type may be encoded as:

| | |
|---|---|
| 00: | No Request |
| 01: | Contention Grant |
| 10: | Collision |
| 11: | Preemptive Grant |

Since the contention grants and preemptive grant share the control fields on the downstream channel, the Central Controller will try to minimize the impacts of the regular contention operation by choosing the feedback data field based on the following order: no request, then collision, then contention grant.

When a preemptive grant is generated by the scheduler, the Central Controller scans through the incoming control mini-slot field and chooses a feedback data field based on the above criteria. It also overwrites the ID field by the CBR connection ID and the feedback field by '11'.

The user terminal (station) operation is briefly described as follows. The basic idea is to treat a preemptive grant as if it were a collision indication.

The station having newly arrived messages

The stations treat it as TQ>0 cases once they see FB=11.

The stations holding TQ positions

The station holding the first position will be preempted and not transmit on the current slot. The stations holding the positions other than the first will not have an effect since the TQ value broadcasted by the Central Controller is not changed.

The station in the contention process

The stations putting their request in the control mini-slot overwritten by the Central Controller treat it as a collision; it is equivalent to FB='10'. Those stations using different mini-slot mini-slot are not impacted.

The CBR station

Transmit the cell on the current slot. Essentially, the station which requests a CBR service needs to maintain two queues: the TQ and a CBR queue.

XDQRAP does an excellent job of handling bursty computer data by providing immediate access for data transmission during light loads and high utilization through fast contention resolution during heavy loads. To summarize XDQRAP protocol:

1. A station randomly chooses one of the Control Mini-Slots (CMS) to put on the connection ID and it indicates the number of cells it wishes to transmit (reservation mode). With modifications to XDQRAP, the number of control mini-slots may be dynamically varied.

2. If a station has only a single cell to transmit and the data slot is not being used, it also puts the data in the data slot (immediate mode).

3. The head-end provides the feedback information for the CMSs and data slot transmission time. If two or more stations collided on a CMS, they enter a collision resolution mode. No new stations can compete for this CMS until it is resolved. If no collision occurred, and the data was sent with the request, the data is forwarded to the destination. If a station has requested multiple slots, the head-end informs the station the starting data slot number to use and the number of slots it can have.

4. Since there are multiple CMSs, the system can overlap contention resolution with data transfers. There is no collision possible for the data slots in reservation mode. The system is stable for offered loads >100% because of separated contention and data transfer areas.

Many stations vie for usage for the data slots and it is possible for delays to occur as stations resolve the contention for these data slots. As seen by the receiver of this data, there could be variation of arrival times even if the information was sent on a periodic basis. For data streams that require minimal buffering, trying to accommodate this variation in arrival time is unacceptable. Embodiment of present invention to handle Continuous Bit Rate (CBR) data streams are described as follows.

FIG. 1 shows information that flows between the headend and at least one user terminal or station having one or more connections. A user terminal may have assigned thereto plural connection identifications (IDs) to support diverse message traffic. The head-end and each user terminal includes a data modulator, a data demodulator and a processor (with memory and input/output circuit).

For available bit rate traffic (ABR traffic), the headend broadcast upstream control slot (e.g., control mini-slot) assignment data to the user terminals. The user terminals store this assignment data and use it to locate where requests may be placed in the upstream data stream.

When a user terminal has ABR data to send to the head-end, the user terminal sends a request in an assigned control slot to request an allocation of upstream data slots to carry the ABR data. Then the head-end acknowledges receipt of the request for allocation.

For constant bit rate (CBR) and variable but rate (VBR) traffic, the user terminals communicate with the head-end to establish a connection. The connection is good until cancelled. It does not have to be renewed with each quantum of data to be transferred. The communication channel may be over the cable network or outside of the cable network (e.g., via telephone line).

The head-end schedules upstream data slots to carry data for all CBR and VBR connections and then schedules upstream data slots to carry data for the pending ABR requests. The head-end then broadcasts grants to the user terminals that give data transmission rights to specifically identified station IDs to carry data upstream in specifically identified upstream data slots based on the above described schedule. In this way CBR and VBR jitter requirements can be fulfilled in systems with ABR contention based mechanisms.

The user terminal responds to a grant by sending the specified data (e.g., defined by station ID) upstream in the specified data slot. Receipt of the upstream data transmission is then acknowledged by the head-end.

Figure 2:
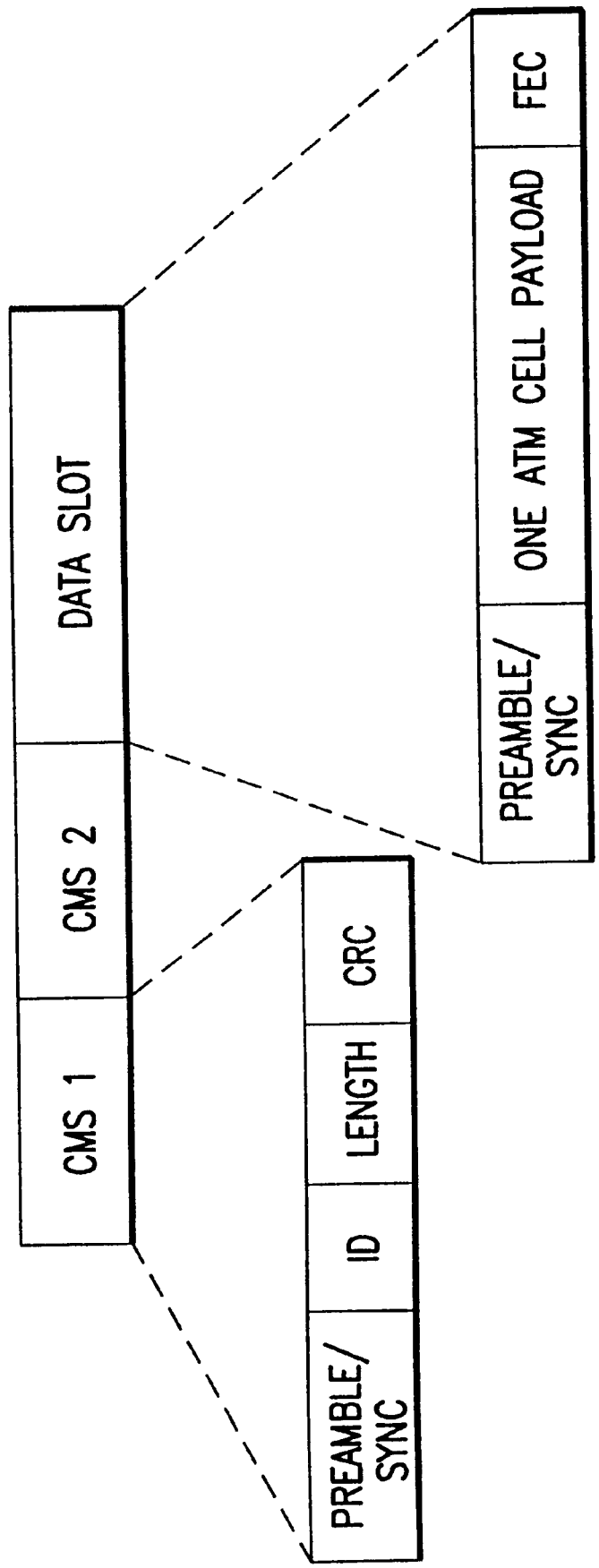
FIG. 2 is a format diagram showing an exemplary format for the upstream frame.

FIG. 2 shows an upstream frame, used for signaling requests and transmitting data from stations to the head-end as used in one embodiment of the invention. The frame includes a data slot and two Control Mini Slots (CMS). Other configurations may be used.

Figure 3:
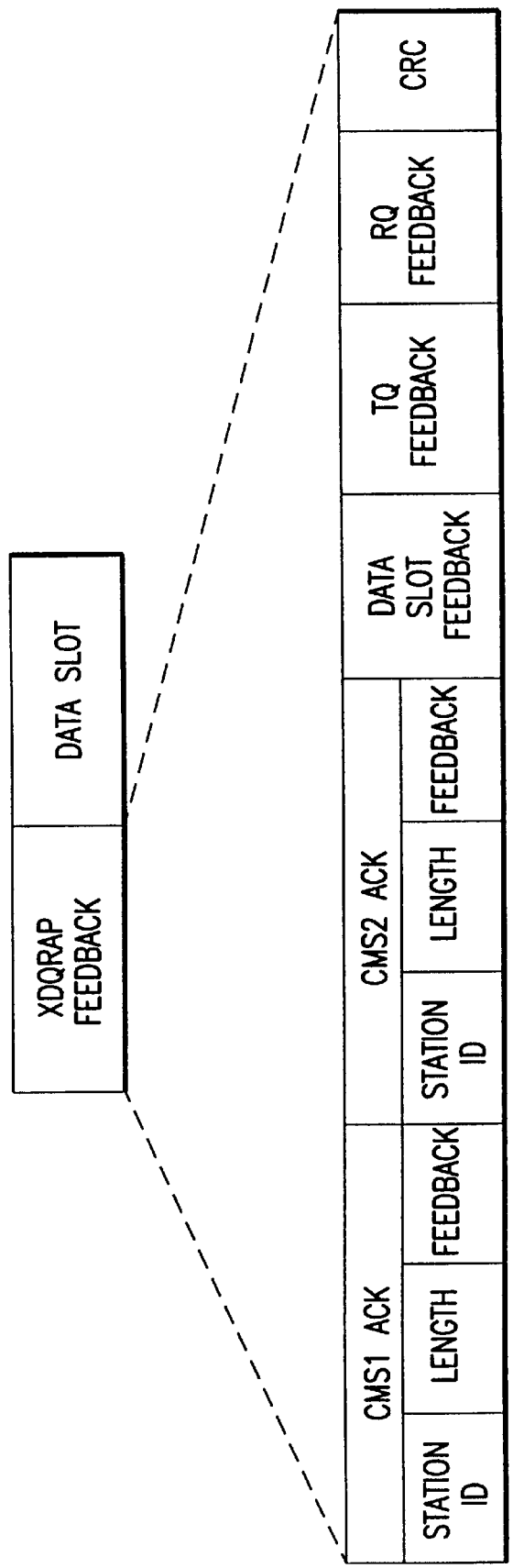
FIG. 3 is a format diagram showing an exemplary format for the downstream frame.

The downstream data frame (e.g., FIG. 3) carries the feedback of the global queuing information and user data from the headend to the stations. The feedback information includes CMS Ack for the control mini-slots, the current values of TQ and RQ, and the status of the data slot. The feedback field is followed by a data slot field containing a number of ATM cells. There is one feedback field for each upstream channel.

In the cable environment there needs to be some centralized control (e.g., at the headend) to allow for authorizing stations to use the network, providing security, and statistics gathering for billing. Generically, this function is called network control and there is at least one element responsible for network resources. The entity responsible for the network resources is called the network control element.

Prior to transmitting data, a station must request a connection be setup by the network. As part of the connection setup process, it informs the network about the characteristics of the path. One of the ways to define the characteristics is called Q.2931, an ITU standard incorporated herein by reference. The process of sending and receiving information about the connection is called signaling. In our environment the signaling information is sent to a network control element located at the head-end.

Q.2931 signaling information consists of the bandwidth, delay and jitter requirements for this connection. CBR data streams would request a specific data rate, maximum end-to-end delay and jitter tolerance. ABR traffic would have the CBR parameters plus minimum bandwidth and burst size information. Several network entities may be involved in the connection such as a switch, intermediate controllers and the destination. Each of these entities can accept, modify or reject the various parameters of the signaling information. This ensures that the network resources exist to support the type of connection required for a particular data stream.

Figure 4:
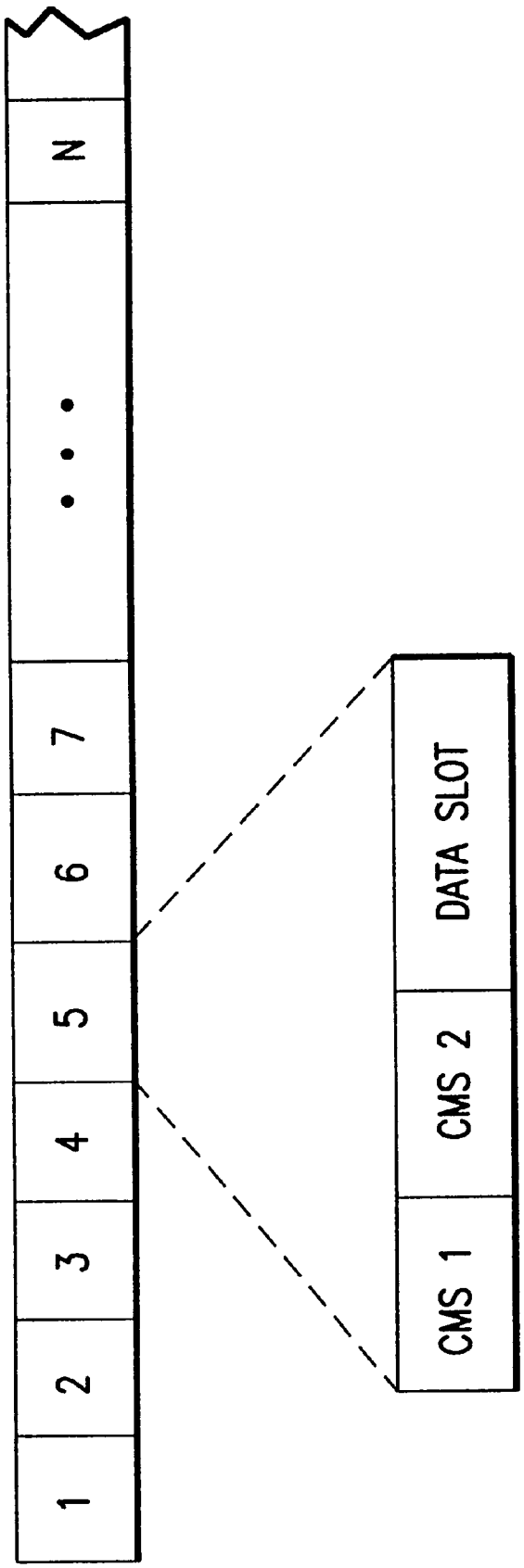
FIG. 4 is a format diagram showing a conceptual upstream time division multiplex of upstream frames.

The CMS and data slot can be viewed as a single entity and part of an infinitely long time domain multiplex (TDM) frame starting at number 1 and going on indefinitely (see FIG. 4). The slot number is the TQ (Transmission Queue) number.

When a station initiates a CBR connection, the head-end begins to allocate a 'TDM slot' periodically at a rate equal to the requested data rate. It can do this because it knows what information rate has been requested and the amount of jitter the connection requires. From the first frame, the head-end is able to calculate the slot number for every data transmission for that connection. Because its centralized control can have other stations transmit data on data slots not previously reserved by CBR connections. This mechanism for providing a station a data slot (TQ) number without the station having to request it via a Control Mini-Slot is called a preemptive grant.

As an example, assume a station wants to request a connection having a bandwidth of 64 Kb/s and minimal jitter. The network control element calculates that the connection requires 167 ATM cells (64 Kb/sec)/(8 bits /byte)/(48 bytes/ATM cell)) to be available in the upstream direction every second. For an upstream QPSK signal of 1 MHz, a 1.544 Mb/s data rate is possible. Our 'TDM slot' consists of 82 bytes and this translates into 2,353 ((1.5 Mb/sec)/(8 bits/byte)/(82 bytes/frame)) available frames in a second. The network controller will allocate every 14th (167/2,353) 'TDM slot' to the station requesting the 64 Kb/sec CBR connection.

Figure 5:
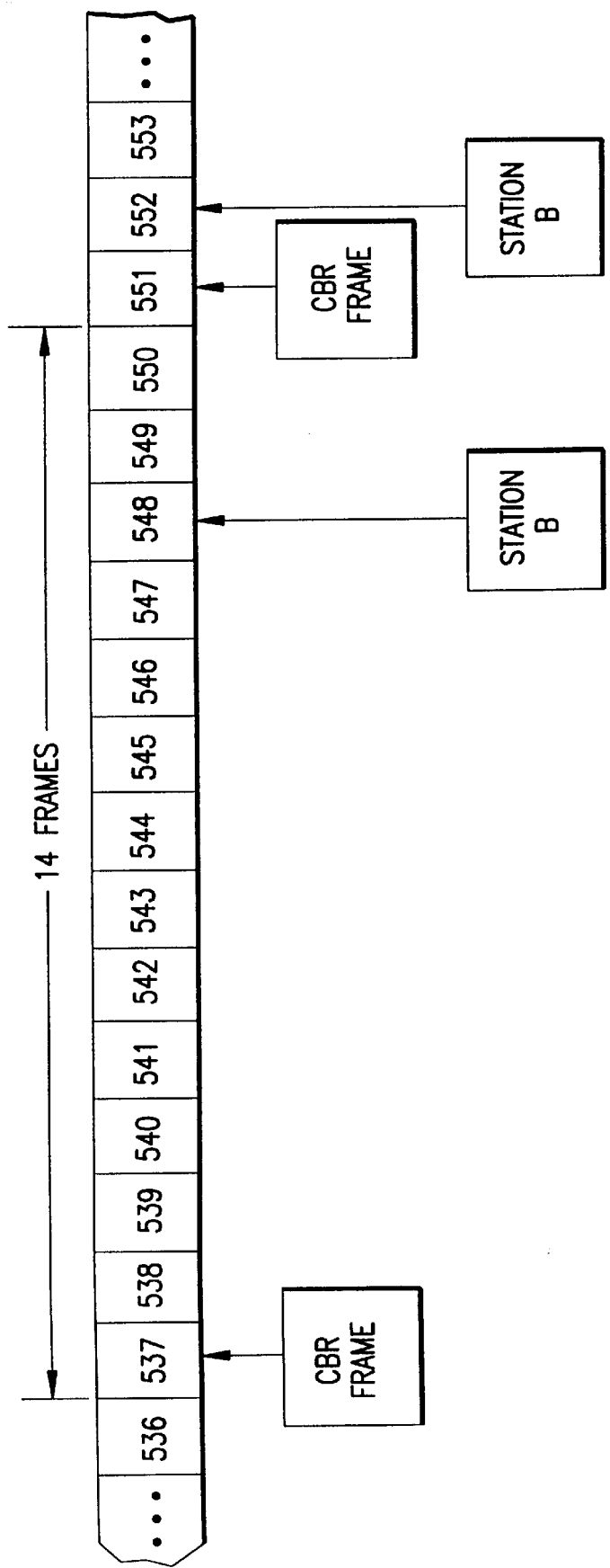
FIG. 5 is a format diagram showing an exemplary embodiment of how the CBR data and the ABR data may share an upstream channel.

As an example, FIG. 5 shows how the CBR and ABR traffic coexist. Assume that the above CBR connection was already established for Station A and another station, Station B, wanted to transmit 5 ATM cells. Using FIG. 5, the network controller issued a preemptive grant during frame 537 and will issue one again during frame 551.

The controller received Station B's request and will issue a starting frame of 548 in response to Station B's request. Because the controller knows that Station A's frame will occur in the middle of the 5 frames, the controller will only allow Station B to have 3 ATM cells transmitted. Station B can issue an immediate request for another 2 ATM cells and have that resolved before the completion of the CBR Frame and transmit the remaining 2 ATM cells starting at frame 552.

In order to make the CBR connections work and to maintain the quality of service for the stations, the network controller must receive the desired network service level from the originating station. As mentioned before, an existing standard from the International Telecommunications Union (ITU) known as Q.2931 may be a useful mechanism to convey the connection characteristics to the network. A subset of this standard (Q.931, Q.932, Q.933) is used in ISDN, Frame Relay and ATM signaling.

Multiple connections from a modem can be mulitplexed over the same physical link. Each connection can have a different class of service such as CBR, VBR, ABR and UBR. The network also guarantees the amount of maximum delay the packet will incur through the network and the amount of variation in arrival time (packet arrival jitter).

The quality of the connection between the source and destination modems is determined by the source modem specifying the characteristics of the connection. The quality of service parameters are negotiated during the connection setup phase. If the modem does not specify a value for a particular parameter, then the default value is assumed. Default values may be network specific or may be established at connection set-up time.

There are three phases of a connection: connection establishment, data transfer, and termination. Connection established is the process of establishing a path through the network that has the characteristics specified. After establishing the connection, the information flows may commence data transfer. After the information has been transferred, the source is required to notify the network to terminate the connection. This termination notification is in the form of a disconnect sequence, and it is required to allow the network to reclaim network resources dedicated to this connection.

Messages are packets that flow between the source modem to the network in order to perform a desired function. The network may return the information requested or request information from devices outside the network.

As discussed above, there is a need to establish parameters that the headend controller will use when the scheduling algorithm. As a useful mechanism for relaying the connection requirements, ITU standard Q.2931 may be employed.

Figure 6:
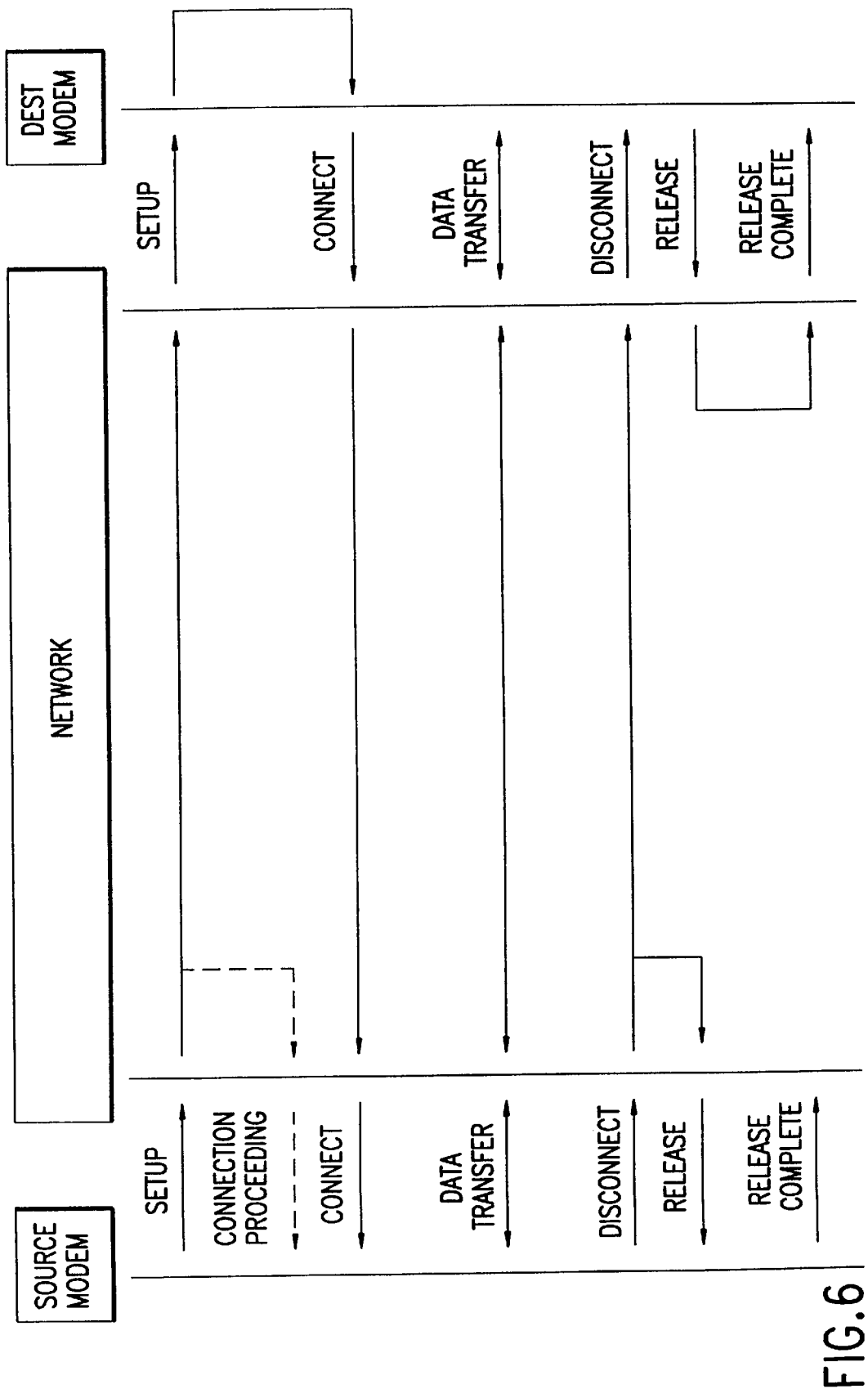
FIG. 6 is a function block diagram showing a signal interface of signals used to establish a CBR connection.

FIG. 6 shows an overview of the connection control messages that flow during the various phases of a connection.

Each packet in a message contains one or more fields called 'Information Elements'. Information elements contain the logical parameters associated with that element. For example, the information element for the 'End-to-End Transit Delay' contains the initiator's requested transit delay and the maximum transit delay that would be accepted. The main Information Elements are listed in Table 1. Some of the connection control messages are described in Table 2.

TABLE 1

INFORMATION ELEMENT IDENTIFIER CODING

| IDENTIFIER # FOR IE | | INFORMATION ELEMENT |
|---|---|---|
| 8765 | 4321 | NAME |
| 0000 | 0100 | Bearer Capability |
| 0100 | 0010 | End-to-End Transit Delay |
| 0000 | 1000 | Cause |
| 0001 | 1001 | Network Connection Identifier |
| 0100 | 1000 | Bandwidth Control Parameters |
| 0110 | 1100 | Source Address |
| 0110 | 1101 | Source Sub-address |
| 0111 | 0000 | Destination Address |
| 0111 | 0001 | Destination Sub-address |
| 0111 | 1110 | User-User |
| 1010 | 0000 | More Data |

TABLE 2

CONNECTION CONTROL MESSAGES

Setup - This message is sent by the initiating modem to the network and by the network to the destination to initiate connection establishment.
Connection Proceeding - This message is sent by the destination to the network or by network to the source. It indicates that the requested connection established has been initiated and no more connection establishment information will be accepted.
Connect - This message is sent by the destination to the network and by the network to the source to indicate connection acceptance by the destination.
Alerting - This message is sent by the destination to the network and by the network to the source to indicate that destination alerting has been initiated.
Release - This message is sent by the initiator or the network to indicate that the equipment sending the message has disconnected the connection and intends to release the network connection identifier (if any) and the connection reference. The receiving equipment should release the network connection identifier and prepare to release the connection reference after sending RELEASE COMPLETE.
Release Complete - This message is sent by the initiator or the network to indicated that the equipment sending the message has released the connection and, if appropriate, the channel. The channel, if released, is available for reuse. The receiving equipment shall release the connection.
Disconnect - This message may be sent by either to request the network to clear the connection or it may be sent by the network to indicate that the connection is cleared.
Status Enquiry - This message may be sent by the user or the network at any time to solicit a STATUS message from the peer layer 3 entity. Sending a STATUS message in response to a STATUS ENQUIRY

TABLE 2-continued

CONNECTION CONTROL MESSAGES message is mandatory. This message is sent by the initiator or the network at any time during a connection to report certain error conditions as listed in section 5.8 of Recommendation Q.931.
User Information - This message is sent by the user to the network to transfer information to the remote user. This message is also sent by the network to the user to deliver information from the other user. This message is used if the user-to-user transfer is part of an allowed information transfer. This message is sent by the user or the network at any time to solicit a STATUS message from the peer layer 3 entity. Sending a STATUS message in response to a STATUS ENQUIRY message is mandatory.

Generically, these messages are called connection control messages. A typical connection control packet would include a Protocol Discriminator, a Connection Reference, a Message Type and one or more Information Elements.

A particular message may contain more information than a particular network needs or can understand. All equipment should be able to ignore any extra information present in a message that is not required for the proper operation of that equipment. For example, the source may ignore the source address during the CONNECT message since it should be its own address.

The purpose of the Protocol Discriminator is to distinguish messages for network connection control from other messages within Q.931. It also distinguishes messages of Q.931 from OSI network layer protocol units that are coded to other ITU Recommendations and other standards.

The value for this field should be x'08' (hexadecimal 08) which is the value for the Q.931/(I.451) user-network call control messages specified in section 4.2 of Recommendation Q.931.

The purpose of the Connection Reference is to identify the connection to which the particular message applies. The Connection Reference does not have end-end significance across the network. See section 4.3 of Recommendation Q.931.

Connection Reference values are assigned by the originating side of the interface for a connection. These values are unique to the originating side only within a particular network port link. The Connection Reference value is assigned at the beginning of a connection and remains fixed for the lifetime of a connection. After a connection ends, the associated Connection Reference value may be reassigned to a later connection. Two identical Connection Reference values on the same connection may be used when each value pertains to a connection originated at opposite ends of the link.

Information Element identifiers (IE) are logical groupings of parameters needed to convey information. The Information Element has its own unique identifier, length field and parameters. Each Information Element remains the same regardless of the Message Type. Usually a particular information element may be present only once in a given message.

Having described preferred embodiments of a novel constant bit rate mechanism in a contention based medium access control (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as defined by the appended claims.

Having thus described the invention with details and particularly required by the patent laws, what is claimed and desired protected by Letters Patent is set forth in the appended claims:

What is claimed is:

1. In a two way communication system that includes a controller and a plurality of user terminals, the controller sending a downstream data stream to the user terminals and receiving an upstream data stream from the user terminals, the downstream data stream including a plurality of grant fields, the upstream data stream including upstream data slots and upstream control slots, a method of granting rights for upstream data transmission from the user terminals, the method comprising steps of:

processing contention requests to generate contention grants;

maintaining a list of connections, each connection having specified therefor a predetermined bit rate;

scheduling preemptive grants for upstream data slots using selected fields of the plurality of grant fields so as to provide preemptive grants for upstream data transport at a bit rate specified for each connection;

sending to the user terminals a data transmission grant in a grant field of the plurality of grant fields for which a preemptive grant is scheduled; and sending to the user terminals a data transmission grant in a grant field of the plurality of grant fields in which a contention grant is pending and no preemptive grant is scheduled.

2. The method of claim 1, wherein:

preemptive grants are scheduled to grant transport rights for one of constant bit rate data and variable bit rate data; and contention grants are generated to grant data transport rights for available bit rate data.

3. The method of claim 1, wherein the step of maintaining includes:

initializing the list of connections when the list contains no connections and a connection is requested; and deleting a connection when the list contains at least a first connection and deletion of the first connection is requested.

4. A controller in a two way cable system that includes a plurality of user terminals, the controller being capable of sending a downstream data stream to the user terminals and receiving an upstream data stream from the user terminals, the downstream data stream including a plurality of grant fields, the upstream data stream including upstream data slots and upstream control slots, the controller for granting rights for upstream data transmission from the user terminals, the controller comprising:

means for processing contention requests to generate contention grants;

means for maintaining a list of connections, each connection having specified therefor a predetermined bit rate;

means for scheduling preemptive grants for upstream data slots using selected fields of the plurality of grant fields so as to provide preemptive grants for upstream data transport at a bit rate specified for each connection;

means for sending to the user terminals a data transmission grant in a grant field of the plurality of grant fields for which a preemptive grant is scheduled; and means for sending to the user terminals a data transmission grant in a grant field of the plurality of grant fields in which a contention grant is pending and no preemptive grant is scheduled.

5. The controller of claim 4, wherein:

preemptive grants are scheduled to grant transport rights for one of constant bit rate data and variable bit rate data; and contention grants are generated to grant data transport rights for available bit rate data.

6. The controller of claim 4, wherein the means for maintaining includes:

means for initializing the list of connections when the list contains no connections and a connection is requested; and means for deleting a connection when the list contains at least a first connection and deletion of the first connection is requested.

* * * * *